April 21, 1970  K. E. STUDENROTH  3,507,587

SEAL STRUCTURE

Filed Feb. 20, 1968

Inventor:
Karl E. Studenroth
By Gary Parker,
Juettner, Pigott & Cullinan Attys

United States Patent Office 3,507,587
Patented Apr. 21, 1970

3,507,587
SEAL STRUCTURE
Karl E. Studenroth, 1609 Euclid,
Chicago Heights, Ill. 60411
Filed Feb. 20, 1968, Ser. No. 706,964
Claims priority, application Germany, Feb. 21, 1967,
1,551,151
Int. Cl. F04c 27/00; F02b 53/00, 55/00
U.S. Cl. 418—121                                    7 Claims

ABSTRACT OF THE DISCLOSURE

A seal for relatively movable machine parts, especially the pistons of a rotary internal combustion engine, comprising a V-groove of a first angle formed in one of the machine parts, a flat spring of V-shape of a greater angle nesting in the V-groove, and a generally V-shaped sealing element of an angle less than that of the spring nesting in the groove and protruding beyond the surface of the one machine part for spring pressed engagement with the other machine part; the groove, spring and sealing element being as long as desired and the spring exerting uniform pressure on the sealing element throughout its length.

The drawings

Description

Figure 1:
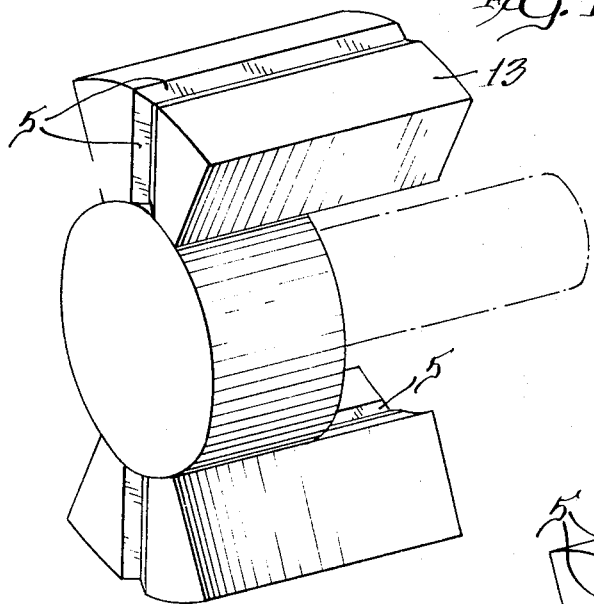
FIGURE 1 is a perspective view of a first rotary piston component of a rotary internal combustion engine equipped with the seal structure of this invention, the view showing only the V-grooves in the piston surfaces.
Figure 2:
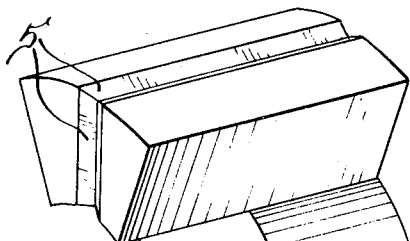
FIGURE 2 is a similar perspective view of a second such piston component.
Figure 3:
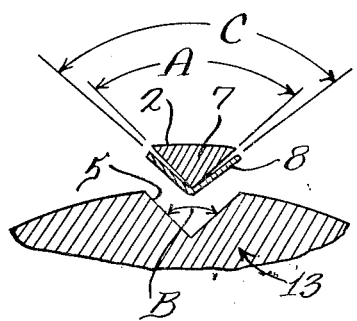
FIGURE 3 is a fragmentary cross-section, on an enlarged scale, of one piston illustrating the seal structure of this invention.

The rotary piston components shown in FIGURES 1 and 2 are intended to be fitted together for mutually dependent sequential rotary movements within a cylinder having a cylindrical wall closely adjacent the peripheral surfaces of the piston components. Since this cylinder for purposes here pertinent is simply an engine block having a cylindrical bore in it, the same has not been illustrated in FIGURES 1 and 2.

Each piston component comprises a cylindrical hub 12 of relatively short axial length and a pair of pistons 13 of a length greater than the hub secured to or formed integral with the periphery of the hub at one end and projecting axially beyond the hub at the other end. Each piston is in the form of a segment of a circle and, by way of example, may be of an arcuate extent of about 45 degrees. The two components fit together with the hubs 12 in substantially face to face relation, the pistons inserted between or interfitting with one another, and the radially inner surfaces of the free ends of the pistons of each component rotatably engaging the periphery of the hub of the other component.

If desired, the components may or may not be guided on a central shaft and this shaft may or may not be secured to one (but only one) of the two components. The shaft has therefore been shown only in phantom lines in FIGURES 1 and 2.

Due to the described mounting of the two components and the arcuate extent of their pistons, the two components are free to rotate bodily and to rotate relative to one another to such extent as to make sequential rotary steps within the cylinder of the engine block. During such sequential stepping, the arcuate spaces between the adjacent radial faces of the pistons form four chambers of varying arcuate extent comprising the combustion chambers of the engine.

To provide effective sealing of the combustion chambers, it is necessary to seal the outer periphery of each piston to the cylinder wall, the inner periphery of the free end of each piston to the hub, and the end faces of the pistons to the end faces of the engine cylinder. Heretofore, this has presented a substantial problem and deterrent to success in rotary internal combustion engines.

According to the present invention, each piston surface required to be sealed is provided throughout its length with a longitudinally extending V-shaped groove 5 formed a relatively small included angle B, for example about 70 degrees. Adapted for cooperation with this groove is a sealing element 7 which may be formed of any material customarily employed for the formation of internal combustion engine piston rings. The element 7 may have an outer face 2 of a configuration to cooperate with the surface which it is to engage, e.g., an arcuate surface for engagement with the cylinder wall or a flat surface for engagement with the cylinder end face, but I prefer a flat surface in all cases.

Otherwise, the element is of a V-shape complementary to the V-groove 5 in the piston, the same also having a relatively small included angle A which may be the same as, smaller than or merely roughly approximate to the included angle B of the groove; in the example given approximately 70 degrees.

Disposed within the groove 5 between the piston and the sealing element is a spring 8 of V-shaped formed at a pre-set angle C greater than the angles A and B. The spring is formed of flat spring stock bent to the desired V-shape and of a length approximately equal to but preferably slightly shorter than that of the sealing element 7. Factors effecting a specific spring design include the thickness and spring strength of the stock from which it is made, to force the sealing element is to exert on the cylinder wall or face, the clearance between the piston and the cylinder, and the pre-set angle of the V. It is therefore to be appreciated that the angle C of the V of the spring may vary quite widely dependent upon other criteria. In the example given, the angle C may, at least in one embodiment of the spring, lie in the range of 72–75 degrees.

In use, the spring 8 is of such pre-set angle as to be flexed or compressed to a smaller angle when the spring and the sealing element are confined between the piston 13 and the opposing cooperating surface, whether the latter surface be the wall or face of the cylinder or the periphery of the respective one of the rotor hubs 12. In this condition, the spring will inherently tend to return to its pre-set angle C and therefore will exert a spring force biasing the sealing element away from the piston and against the cooperating machine surface, at whatever pressure may have been predetermined to be desirable.

Moreover, this spring force will be exerted uniformly over the full length of the sealing element and bias the same against the cooperating machine surface with uniform pressure throughout its length.

Also, due to the relatively small mass of spring and the sealing element, centrifugal force will have no more than a minimal effect on the sealing function, whether the seal is biased radially inwardly or radially outwardly of the piston.

Regarding the angles of the three V's, it is to be appreciated that the important factor is relativity, rather than specific angles; i.e., the angles A and B must be smaller than the angle C and the angle A of the sealing element 7 should preferably not be significantly larger than the angle B of the groove. The difference between angles A and B on the one hand and angle C on the other is a variable depending upon the environment, particularly the spacing of the machine parts, the sealing force to be exerted and the spring characteristics of the material from which the spring 8 is formed. For example, angle A could be 70 degrees, angle B 75 degrees and angle C 85–95 degrees; and the structure would still provide a highly effective seal in accordance with this invention.

Figure 4:
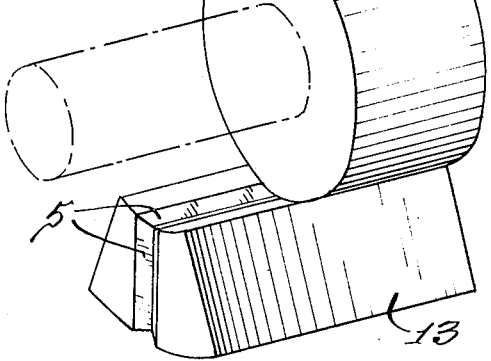
FIGURE 4 is a side elevation of the spring and sealing element of said structure.
Figure 4:
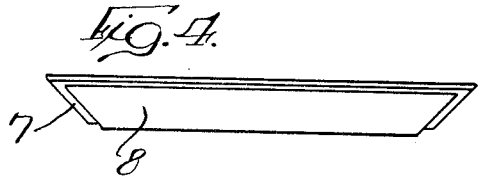

In an environment such as illustrated in FIGURES 1 and 2, wherein seals are required in surfaces disposed at angles to one another (here right angles) each sealing element is preferably provided with mitered ends (here 45 degrees as shown in FIGURE 4) or stepped ends extending beyond the surface of the piston in which it is mounted so as to coopearte with the complementary shaped end of the next adjacent sealing element, whereby to provide a substantially continuous seal about the piston.

It will thus be appreciated that the invention provides a highly economical, efficient and practical sealing structure for relatively movable machine elements.

I claim:

1. A sealing structure for a pair of relatively movable machine parts comprising a V-groove in one of the machine parts, a spring of V-shape in cross section nesting in said groove and a V-shaped sealing element nesting in said spring, the angle of the V of said spring being significantly greater than the angles of the V's of said groove and said sealing element.

2. A sealing structure as set forth in claim 1 wherein the angle of the V of said sealing element is not substantially greater than the angle of the V of said groove.

3. In a rotary internal combustion engine having pistons rotatable within a cylinder having a cylindrical wall and end faces opposed to the periphery and the end faces of the pistons, a sealing structure for the pistons comprising a longitudinally extending V groove in the periphery of each piston and a corresponding radially extending V groove in each end face of each piston, a spring of V-shape in cross section nesting in each of said grooves and a V-shaped sealing element nesting in each of said springs, each of said springs having a pre-set V angle significantly greater than the angles of the V's of the respective grooves and sealing elements, the springs being compressed between the sealing elements and the pistons to a lesser angle and thereby biasing the sealing elements outwardly from the pistons and against the opposed surfaces of the cylinder.

4. In an internal combustion engine as set forth in claim 3, said sealing elements having shaped ends extending beyond their respective grooves and complementing the adjacent ends of the adjacent sealing elements to form a complete seal about each piston.

5. In an internal combustion engine as set forth in claim 3, each of said pistons including a radially inner peripheral surface riding on a hub, each piston having a V groove in said inner peripheral surface, a spring nesting in said groove and a radially inwardly facing sealing element nesting in the respective spring and engaging the respective hub.

6. In an internal combustion engine as set forth in claim 3, the angle of the V of each said sealing element being not substantially greater than the angle of the V of the respective groove.

7. In an internal combustion engine as set forth in claim 3, the sealing elements engaging the cylindrical wall of said cylinder having flat faces each providing two lines of sealing engagement with the wall.

References Cited

UNITED STATES PATENTS

| | | |
|---|---|---|
| 2,790,520 | 4/1957 | Kuhn. |
| 2,975,576 | 3/1961 | Henry. |
| 3,189,263 | 6/1965 | Ansorg. |
| 3,263,912 | 8/1966 | Frenzel _____ 230—145 |
| 3,369,739 | 2/1968 | Abermeth. |

MARK M. NEWMAN, Primary Examiner

A. D. HERRMANN, Assistant Examiner

U.S. Cl. X.R.

277—138